US011951566B2

United States Patent
Vasil et al.

(10) Patent No.: US 11,951,566 B2
(45) Date of Patent: Apr. 9, 2024

(54) ASSIGNMENT OF MULTIPLE PRINT PARAMETER SETS IN ADDITIVE MANUFACTURING

(71) Applicant: GENERAL ELECTRIC COMPANY, Schenectady, NY (US)

(72) Inventors: Christina Margaret Vasil, Troy, NY (US); Subhrajit Roychowdhury, Schenectady, NY (US); Arvind Rangarajan, San Ramon, CA (US); Joshua Mook, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 534 days.

(21) Appl. No.: 16/527,432

(22) Filed: Jul. 31, 2019

(65) Prior Publication Data
US 2021/0031302 A1 Feb. 4, 2021

(51) Int. Cl.
*B23K 26/342* (2014.01)
*B23K 26/06* (2014.01)
(Continued)

(52) U.S. Cl.
CPC ........ *B23K 26/342* (2015.10); *B23K 26/0608* (2013.01); *B23K 26/062* (2015.10);
(Continued)

(58) Field of Classification Search
CPC ............... B23K 26/342; B23K 26/062; B23K 26/0608; B33Y 10/00; B33Y 30/00; B33Y 50/02
(Continued)

(56) References Cited

U.S. PATENT DOCUMENTS

2014/0099476 A1\* 4/2014 Subramanian ....... B23K 26/342
428/164
2015/0123320 A1 5/2015 Joyce
(Continued)

FOREIGN PATENT DOCUMENTS

CN 107498052 A 12/2017

OTHER PUBLICATIONS

"PVENG, How Permissible Cycle Life (or Fatigue Life) is Calculated using FEA, Oct. 25, 2012" (Year: 2012).\*
(Continued)

*Primary Examiner* — Janie M Loeppke
*Assistant Examiner* — Simpson A Chen
(74) *Attorney, Agent, or Firm* — Hanley, Flight & Zimmerman, LLC

(57) ABSTRACT

A method, medium, and system to obtain an assignment of one of a plurality of different additive manufacturing (AM) print parameter sets to each of a plurality of 3D volume elements forming a representation of the model of the part; define a plurality of groupings based on margin parameter values associated with the model of the part; assign a print parameter set to each grouping; automatically assign each of the plurality of print parameter sets to a laser of a multi-laser AM device; save a record of the determined print parameter sets to laser assignments; and transmit the record of the determined print parameter sets to laser assignments to an AM controller to control the multi-laser AM device to generate the part based on the model of the part and the determined print parameter sets to laser assignments, the generated part to be built in a single build.

19 Claims, 4 Drawing Sheets

(51) Int. Cl.
*B23K 26/062* (2014.01)
*B33Y 10/00* (2015.01)
*B33Y 30/00* (2015.01)
*B33Y 50/02* (2015.01)

(52) U.S. Cl.
CPC .............. *B33Y 10/00* (2014.12); *B33Y 30/00* (2014.12); *B33Y 50/02* (2014.12)

(58) Field of Classification Search
USPC ....................................................... 219/76.1
See application file for complete search history.

(56) References Cited

U.S. PATENT DOCUMENTS

| | | |
|---|---|---|
| 2016/0114432 A1 | 4/2016 | Ferrar et al. |
| 2017/0056970 A1 | 3/2017 | Chin et al. |
| 2017/0057164 A1 | 3/2017 | Hemphill et al. |
| 2018/0144277 A1 | 5/2018 | Srivastava et al. |
| 2018/0281112 A1 | 10/2018 | Roerig et al. |
| 2018/0290239 A1* | 10/2018 | Haro Gonzalez .... B23K 26/342 |
| 2019/0217416 A1* | 7/2019 | Brochu ................... G06F 30/23 |
| 2020/0004225 A1* | 1/2020 | Buller .................... B29C 64/393 |
| 2020/0156323 A1* | 5/2020 | Woytowitz .............. G06T 17/20 |
| 2020/0230744 A1* | 7/2020 | Fried ........................ B22F 10/36 |
| 2020/0376552 A1* | 12/2020 | Fukuda ................. B29C 64/386 |

OTHER PUBLICATIONS

MacCurdy, Robert, et al. "Printable programmable viscoelastic materials for robots." 2016 IEEE/RSJ International Conference on Intelligent Robots and Systems (IROS). IEEE, 2016. (Year: 2016).*

Piili, Heidi et al., "Cost Estimation of Laser Additive Manufacturing of Stainless Steel", Physics Procedia, vol. 78, 2015, DOI: 10.1016/j.phpro.2015-11-053, (pp. 388-396, 9 total pages).

Khairallah, Saad A. et al., "Laser powder-bed fusion additive manufacturing: Physics of complex melt flow and formation mechanisms of pores, spatter, and denudation zones", Acta Materialia, vol. 108, Apr. 15, 2016, DOI: 10.1016/j.actamat.2016.02.014, (pp. 36-45, 10 total pages).

* cited by examiner

ASSIGNMENT OF MULTIPLE PRINT PARAMETER SETS IN ADDITIVE MANUFACTURING

BACKGROUND

The field of the present disclosure generally relates to additive manufacturing, and more particularly, to an additive manufacturing methodology and tool to automatically assign different print parameter sets to multiple different lasers of an additive manufacturing system.

Parts generated using additive manufacturing (AM) processes are typically generated (e.g., printed) using one, common set of print parameters for the entire part being produced. For example, an AM process such as, for example, direct metal laser melting (DMLM) process, print a part using a same laser power, same laser speed, and same laser focus size for the entirety of the build (i.e., first layer through last layer) of the part.

In some instances and use-cases, one or more portions of a part might be more heavily loaded than other portions of the same part. A design process to determine the print parameter set to use in an AM process for the part might typically consider the most heavily-loaded portions of the part, in an effort to ensure that all portions of the part (i.e., the entire part) meets or satisfies the minimum design specifications for the part. However, a consequence of this typical design philosophy will likely result in the over-design of at least some portions of the part since not every portion of the part will be subjected to the heaviest of foreseen loads the part will experience. That is, the typical AM design process will determine the print parameter set to be used to print the part based on the maximum loads, even though only a portion of the part is anticipated to be subjected to the maximum load.

Accordingly, in some respects, a need exists for methods and systems that provide an efficient and accurate mechanism for automatically determining AM print parameter sets for a multi-laser AM device or system while satisfying the design specifications for the part.

DETAILED DESCRIPTION

Figure 1:
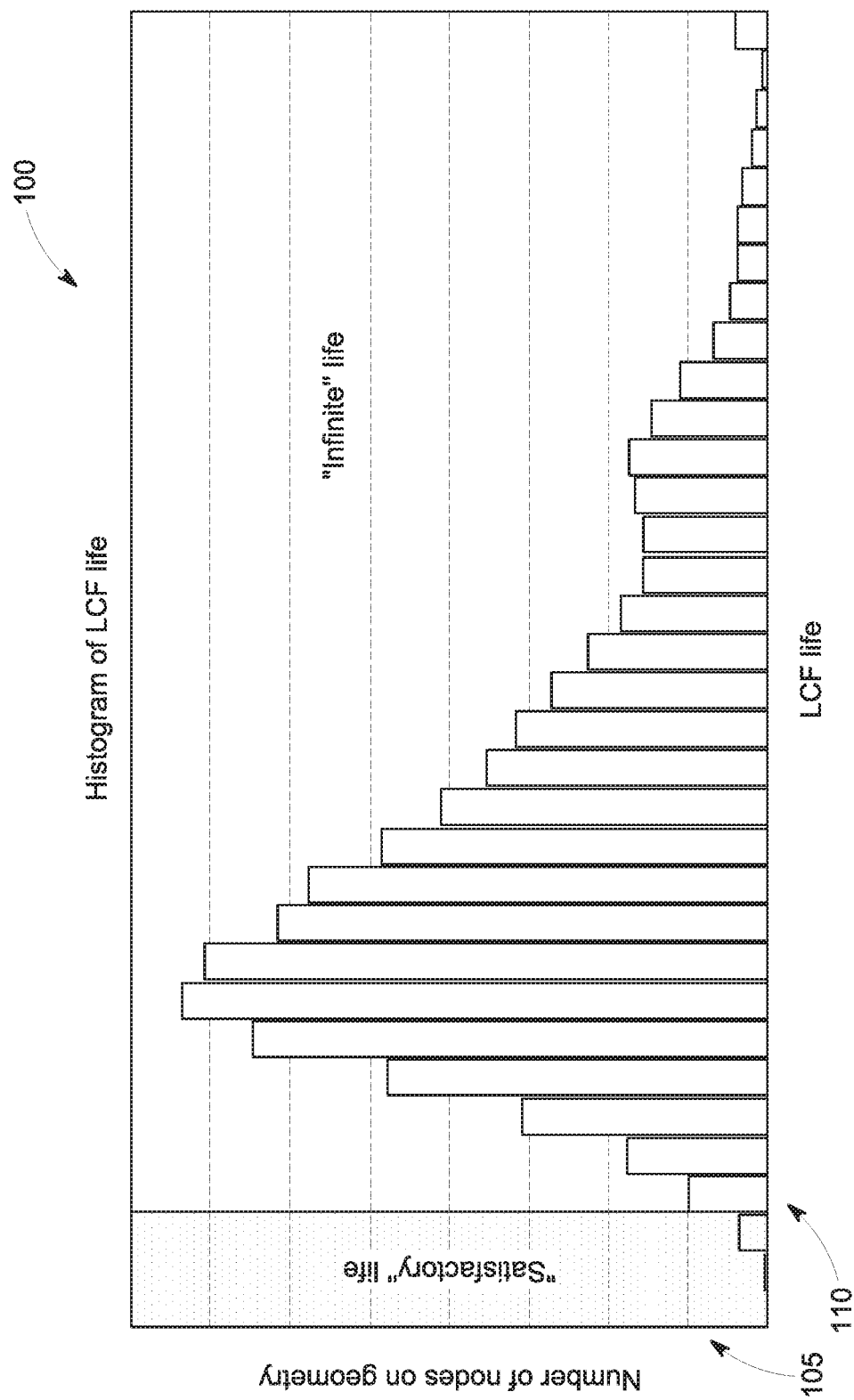
FIG. 1 is an illustrative example histogram of analytical results depicting life cycles for a part to be additively manufactured, in accordance with some aspects of an example process herein.

Embodying systems and methods herein relate to Additive Manufacturing (AM) systems that, in general, produce a three-dimensional (3D) object or assembly by printing materials under computer control. AM processes and systems may successively add materials, for example in layers, to create the three-dimensional assembly or object based on 3D model data (i.e., a specification) of the part. In general, objects, assemblies or parts (as generally referred to herein) generated using AM processes might be conventionally produced by an AM device or system using a single, constant print parameter set for build of the part. That is, a single, constant print parameter set may be used (i.e., applied) during the entirety of a single build of the part. The print parameter set for the part build may be determined based on the margins for the limiting condition(s) applicable or otherwise imposed on the design process for the part. For a part having isolated areas or regions thereof requiring (e.g., per design constraints, design objectives, etc.) high fidelity print parameters, the entire part will be printed with the high-fidelity print parameters since a single, constant print parameter set will be used (i.e., applied) during the entire build of the part, in the conventional AM process scenario. As a result, the remainder of the areas, regions, or portions of the part other than the isolated areas or regions of the part requiring the use high-fidelity print parameters during the AM process will also be printed using the high-fidelity print parameters. Consequently, the remainder of the part might be printed with material properties exceeding that which are necessary within safety, useful life, design, and other margin constraints for the part. Since high-fidelity print parameters used to achieve high-fidelity materials might require a longer print time than other, nonhigh-fidelity (i.e., lower) print parameters, printing a part within a single build strictly using the high-fidelity print parameters may have the undesired effect of, for example, unnecessarily increasing the time and/or costs to print the part, as well as other undesirable impact(s).

In some aspects herein, the present disclosure relates to a system, tool, and methodology to automatically determine a plurality of different print parameters for manufacturing a part within a single build, wherein the plurality of different print parameters are determined based on analytical results determined for the part. However, in some instances where different print parameter sets are used to print a part in a single build, "transition zones" may be created between contiguous regions of a part printed by a laser of an AM device or system using two different print parameter sets. The transition zones may be created since the AM laser typically cannot instantaneously switch from printing with a first set of print parameters to printing with a second set of print parameters. A number of constraints might prevent the instant switch-over from printing with a first set of print parameters to printing with a second set of print parameters, including, for example, AM device system dynamics, laser responsiveness, device inertia, and other factors. During the time the laser transitions from printing a first region of the part using the first set of print parameters to printing a second region of the part adjacent to the first region using the second set of print parameters, a "transition zone" is printed wherein the laser does not perform with characteristics of either the first set of print parameters or the second set of print parameters. In the transition zone, the material produced by the AM device may differ from material produced AM device using either the first set of print parameters or the second set of print parameters. Whereas the material produced by the AM device using either the first set of print parameters or the second set of print parameters will have a desired and/or known material response curve, the transition zone produced material may have an unknown, unpredictable, and/or undesired material response curve. A feature of some transition zones is non-linear variance of the material's material response curve.

In some aspects, the present disclosure includes mechanism(s) for determining and assigning different print parameter sets to different lasers of a multi-laser AM device, system, or machine to, for example, reduce or eliminate transition zones between regions of a part printed using different print parameter sets during a build of the part. In some instances, the determined plurality of different print parameters (e.g., print parameter sets) might be selectively assigned to different lasers of a multi-laser AM system and used thereby to generate the part without transition zones, with increased speed (as compared to producing the part with a single print parameter set), while also maintaining safety, useful life, design, and other margin constraints for the part.

FIG. 1 is an illustrative depiction of an example histogram 100 of analytical nodal results of low cycle fatigue (LCF) life cycles for a given part to be produced by an AM process, wherein the part meets or satisfies all material design constraints. In FIG. 1, the x-axis 110 represents the LCF life cycles to failure and the y-axis 105 represents that number of nodes for the part. As used herein, the term life cycles refers to the number of repeated applications of stress that will lead to fatigue failure. In the example histogram 100 of FIG. 1, a portion of the part is considered to have "infinite" life if the number of life cycles to failure is equal to $10^6$ or more cycles. As seen from FIG. 1, a major proportion of the part has an "infinite" life. Due to the small proportion of the part having less than infinite LCF life cycles, the entire part would otherwise be printed with one set of print parameters. Printing the entire part with one set of print parameters to accommodate a small region of the part will increase the time to print the part (i.e., slow down the AM printing process). That is, while the one set of print parameters might be sufficient to accommodate the small region of the part (i.e., the portion(s) with less than "infinite" life cycles to failure), the single prescribed set of print parameters is more than that which is necessary for the remaining majority of the part, as indicated by the "infinite" life indicated for the remaining, majority portion of the part.

As an example, if a lifecycle analysis of a given part determines that a portion of the part has a predicted lifecycle less than infinite (e.g., about 200,000 cycles) and the rest of the part has an infinite lifecycle, then it may be concluded that the portions of the part having an "infinite" lifecycle are over-designed based on the premise that it is not practical or necessary for, at least some, portions of the part to have an infinite lifestyle.

In some aspects herein, a lifecycle analysis of a part might be leveraged so that at least one portion/region of a part with a predicted "infinite" lifecycle may be printed faster, using print parameters different (e.g., lower fidelity) than a set of (e.g., relative high fidelity) print parameters that would produce the predicted "infinite" lifecycle. In general, faster printing by an AM process may result in a relatively lower quality of material, relative to slower print speeds and corresponding higher fidelity AM build print parameter sets. In some aspects, the lower quality of material produced by the faster printing AM process, as controlled by corresponding print parameter set(s), will be selected or determined such that they still maintain, meet, or other satisfy all material quality, safety, useful life, design, and other margin constraints (i.e., design specifications) for the part.

In some embodiments, the present disclosure leverages a methodology to modify or otherwise determine different print parameter sets for an AM process for a part within a single build based on analytical results. In some instances, the methodology might operate to increase a print speed and/or decrease other costs/objectives associated with printing the part, all while achieving or maintaining a minimum (e.g., specified) part life (or other one or more objectives and/or constraints) for the part. In some aspects, the present disclosure relates to a process and system that determines different print parameter sets for a given part, on a granular layer for each of a predetermined portion, region, or area of the part, as opposed to a single AM build print parameter set for the entire part. In some embodiments, an AM print parameter set might be determined based on, for example, a per layer basis, a per voxel basis, and any other unit of volume (i.e., volume unit) representation of the part. In some aspects, the print parameter sets determined herein are design-based changes and determinations, in contrast to prior and/or other print parameter sets determined based on a geometry of the part being produced.

Figure 2:
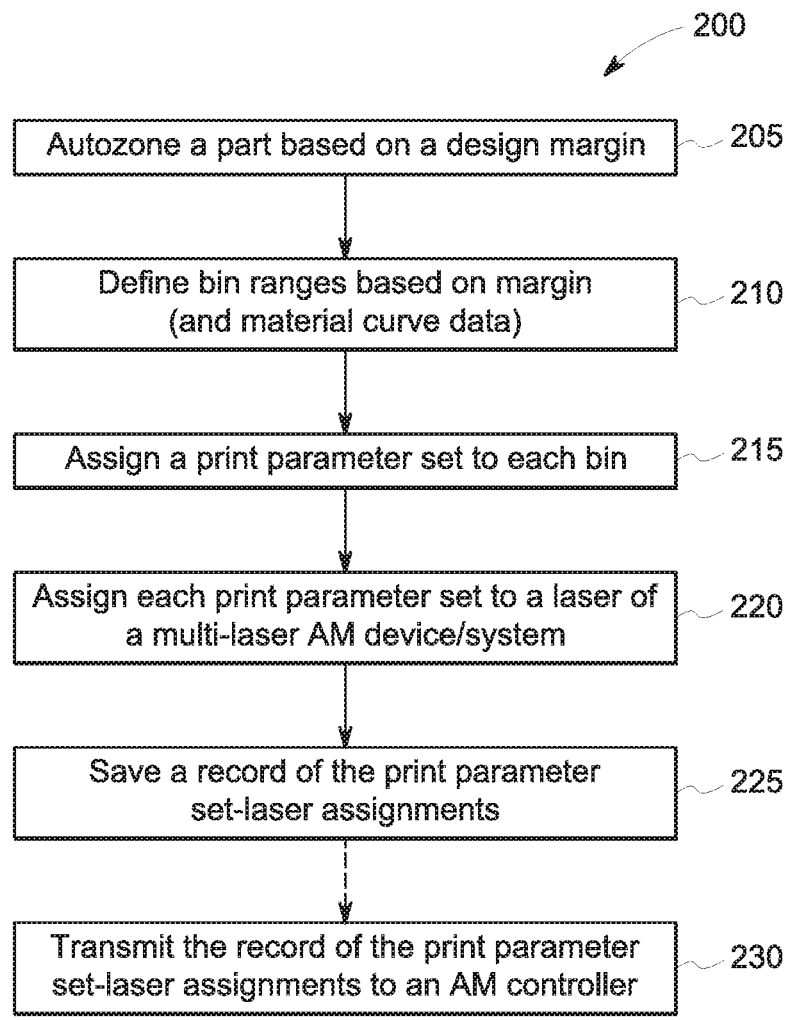
FIG. 2 is an illustrative flow diagram of an automatic print parameter generation process, in accordance with some embodiments.

FIG. 2 is an illustrative example of a process 200, according to some embodiments herein. Process 200 includes, at operation 205, a mechanism to automatically determine, based on analytical results, a plurality of print parameters sets to use to build a given part by an AM process. The processes or operations of operation 205 may collectively be referred to as the "autozoning" of a part, wherein a plurality of print parameters sets is determined for printing multiple different regions of a part during a single AM build of the part. In accordance with some aspects of process 205, print parameter sets may be determined based on a function of how a part will characteristically behave or respond when built to design specifications. As such, operation 205 relates to a design-based process to determine different print parameter sets for an AM part build. In some aspects, operation 205 is not to limited to any one particular AM process protocol, modality, system, or device, unless otherwise noted herein. In one example, operation 205 may be implemented in the context of a direct metal laser melting (DMLM) process, where the set of print parameters might include, for example, a laser power, a laser speed, and a laser focus size, although additional, fewer, and other print parameters may be considered, alone or in combination.

Referring to operation 205, a model representation of a part to be produced by an AM process may be obtained, prior to, in response to a request to start operation 205, or as part of operation 205. The model of the part may be embodied in a tangible, non-transitory data structure, such a file or record. The model of the part may be formatted or configured in any file format now known or that becomes known, that sufficiently describes the part for purposes of executing operation 205. The model of the part might be obtained by an operator, servicer, or provider of an AM process or service.

Having obtained the model of the part, an AM simulation using an initial (i.e., original, default, or previously determined (e.g., estimated) print parameter set) is executed on the model of the part at operation 205. An objective of the simulation of operation 205 may be to perform a physical, load analysis using the relevant design boundary conditions (i.e., margin) and material properties of the part to emulate the forces and stresses each area or region of the part might be subjected to during the part's life. For example, the analysis might determine areas or regions of high loading. In the present example, the high loading region(s) may likely fail before other portions or regions of the part. In some aspects, the high load region(s) of a part may be the life-limiting region(s) for the part that will fail first. Accordingly, operation 205 may operate to meet or satisfy the material design specifications for high-loading regions.

Operation 205 or any other process(es) or portions thereof are not limited with respect to the number of high load regions, other regions, and total regions for a part, unless otherwise stated herein.

The analysis of the part at operation 205 (or an aspect therein) may include extracting nodal results representing the margin related to the primary failure mode (i.e., life cycles or other one or more parameters) and providing an output (i.e., record) thereof. Operation 205 may further include a determination to obtain a representation of the model of the part as a plurality of discrete three-dimensional (3D) volume units. In some instances, the volume units might be a voxel (e.g., a 3D pixel), a plurality of voxels, or other defined or specified volumetric unit of 3D measure.

In some aspects, operation 205 may determine, based on an output of the load analysis performed therein or therefore, a life cycle (or other one or more parameter) value(s) to assign to each of the plurality of discrete 3D volume elements. As used herein, the life cycle value associated with each 3D volume represents or is otherwise indicative of how long each respective 3D volume "live" to perform as it is designed (i.e., the 3D volume unit's life cycle). In some respects, the predicted life cycle is determined based on the load analysis.

In some embodiments, the parameter associated with each 3D volume at operation 205 may not be limited to be an indication or representation of LCF. In some embodiments, the parameter value might be one or more of any material behavior property (e.g., tensile strength, surface roughness, etc.), physical property (e.g., density, thermal conductivity, etc.), and other properties. That is, the particular properties or constraints that might be considered as a basis for determining build parameters in some embodiments herein is not limited to LCF, unless otherwise specified.

In some instances, the particular one of more property values associated with the 3D volume units or elements might vary depending on the 3D volume. As an example, some voxels of a model of a part might be associated with a LCF value, whereas some other voxels of the model of the part might be associated with a density value. In this manner, the properties associated with the model of the part might be tailored the particular model on the unit volume element level.

Continuing with the discussion of operation 205, based on the life (or other parameter or constraint) value assigned to each of the plurality 3D volume elements, one of a plurality of AM build parameters sets is automatically assigned to each of the plurality of 3D volume elements. This determination of assignments might be implemented by a variety of processes. In one embodiment, a software application may generate, obtain, or otherwise provide one or more transfer functions that represent the relationship(s) between the expected material outcomes (e.g., LCF, density, etc.) and the processing parameters used to control an AM or 3D printing process. The transfer function(s) may be used to leverage and relate the life (or other parameter or constraint) values assigned to each of the plurality 3D volume elements to AM process control parameters.

At operation 210, "bins" (i.e., groupings) including a range of the margin (e.g., life or other parameter or constraint) values assigned to each of the plurality 3D volume elements are determined. For example, the total range of LCF values might extend from about 10^ 4 to about 10^ 7, wherein this full range is divided into four different "bin ranges". In some embodiments, the number of bins (and corresponding bin ranges) might be (pre-)determined. In some embodiments, the number of bins might be determined, at least in part, on a number of print parameter sets to be used (or potentially used), the total extent or range of the margin values, and other factors, either alone or in varying combinations with each other.

Figure 3:
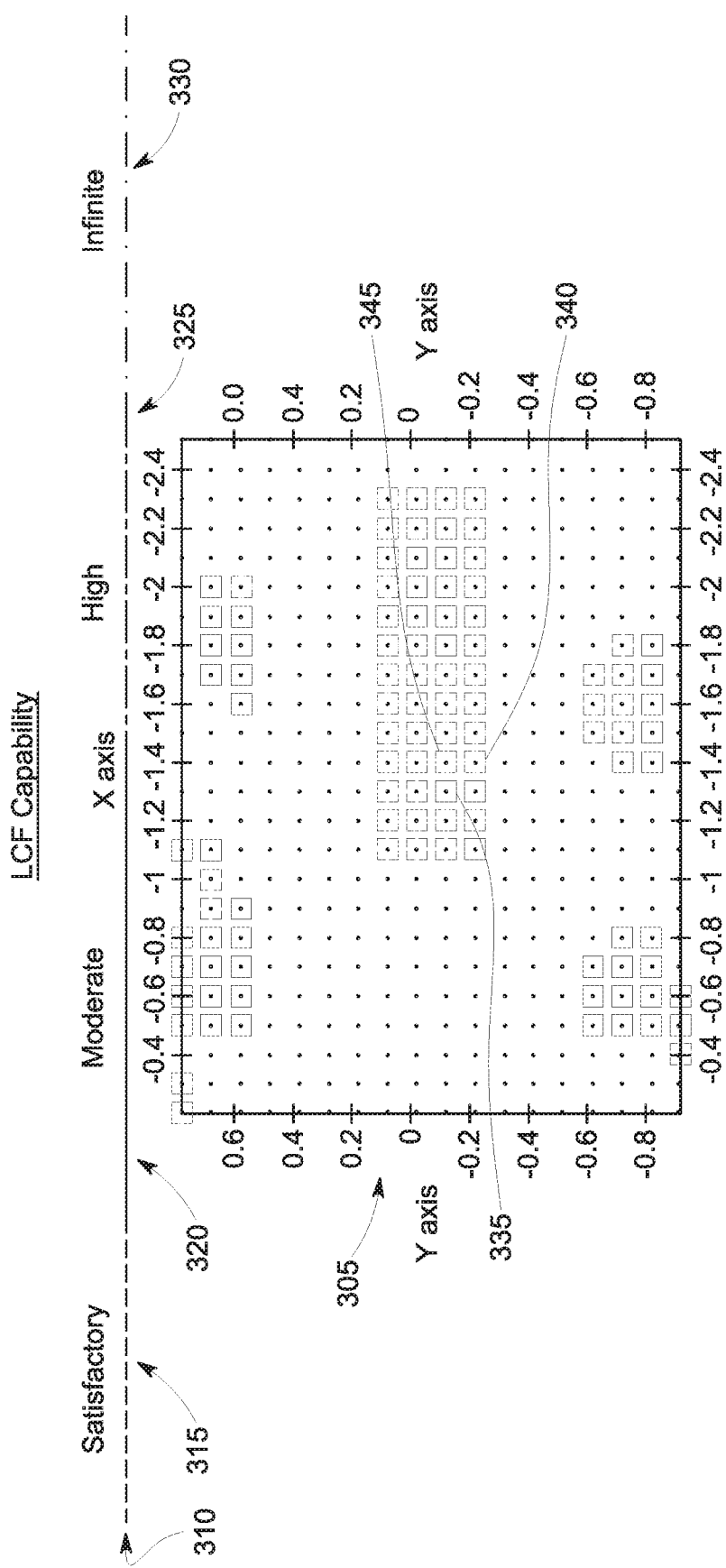
FIG. 3 is an illustrative depiction of a graph of a distribution of the range of LCF margins for an example part, in accordance with some aspects of an example process herein.

FIG. 3 is an illustrative depiction of a graph 300 of the distribution of the range of LCF margins for an example part. One layer 305 (i.e., slice) of the part to be generated (i.e., printed) by an AM process is illustrated. In the example of FIG. 3, the part is generally square-shaped, thereby resulting in the square-shape depiction of the layer 305. A legend 310 is positioned at the top of graph 300, depicting the total range of the LCF margin values. As also shown, the total range is divided into four (4) bin ranges 315, 320, 325, and 330. Each unit volume (e.g., voxel, group of voxels, etc.) in the illustrated layer 305, as determined in the autozoning operation 205, has an associated margin (e.g., LCF value). Per operation 215, each unit volume in layer 305 is assigned or otherwise associated with one of the defined bin ranges. Accordingly, each unit volume in layer 305 is represented in one of the colors/shades of the bin ranges of legend 310.

In some aspects, FIG. 3 also illustrates how a laser of an AM device or system might be called upon to produce a region of a part (e.g., voxel 335) using a first print parameter set, produce a second region of the part (e.g., voxel 340) using a second print parameter set, and produce a third region of the part (e.g., voxel 345 using a third print parameter set). As discussed above, AM device/system lasers may not be able to instantaneously switch between different print parameter sets in a step-like fashion and might produce a transition zone between regions (e.g., voxels) printed using different print parameter set.

In some embodiments herein, an AM device, system, or machine having multiple lasers may be used to manufacture a part, wherein the different lasers of the multi-laser AM device, system, or machine can each be assigned to a different print parameter set. That is, each laser of the multi-laser AM device, system, or machine can be assigned to print the part using one of the different print parameter sets determined to be used in the printing (i.e., manufacturing) of the part. This aspect of the present disclosure is represented at operation 220 of process 200. Operation 220 functionally assigns a print parameter set to each laser of a multi-laser AM device, system, or machine. In some aspects, each laser may be controlled to operate with a known parameter set such that, for example, the material properties may at least be controlled within a transition zone, if any, will be produced in a part generated by an AM process due to a single laser migrating from a first parameter set to a second parameter set in, at least, a same layer of AM build of a part.

In some embodiments, an assignment of the parameter sets to the particular lasers of a multi-laser AM device, system, or machine might be executed after the parameter sets are assigned to the determined bins, whereas in some other embodiments the assignment of the parameter sets to the particular lasers of a multi-laser AM device, system, or machine might be performed before the parameter sets are assigned to the determined bins In some embodiments, the number of lasers in a multi-laser AM device, system, or machine might not correspond exactly (i.e., 1:1) with the number of print parameter sets or bins for a particular implementation of some aspects herein. For example, a multi-laser AM device, system, or machine with two (2) lasers might be used in an application with four (4) print parameter sets; a multi-laser AM device, system, or machine with four (4) lasers might be used in an application with two (2) print parameter sets; etc. In some instances where the number of lasers might be greater than the number of print parameter sets for a particular context or application, one or more of the lasers of the multi-laser AM device, system, or machine might be turned off or otherwise not used for the particular build, the excessive lasers may be assigned to a zone that another laser is already working on (e.g., such that the particular zone is finished faster), and other applications, whether alone or in combination.

Returning to FIG. 2, a record of the assignments of each of the plurality of AM print parameters sets to one of the lasers of a multi-laser AM device, system, or machine 3D volume elements is saved or otherwise stored at operation 225. The saved record of the AM build print parameter sets—laser assignments may be persisted in, for example, a database, a cloud-based data storage system, or other local, remote, centralized, or distributed data systems, stores, or warehouses.

In some embodiments, operations 205-225 may comprise the operations of process 200. In some instances, operation 230 represents an example of an integrated use or application of process 200, including the record of the AM build parameter sets—laser assignments. For example, the record might be transmitted to an AM controller of an AM system or device, wherein the AM controller may use the information specified in the record to command the AM device or system to generate the part using the print parameter sets—laser assignments as specified in the record. It is noted that the record might be used for other applications, including, for example, executing a distortion model based on the record to, for example, validate the AM build parameter set assignments (i.e., do the recommended AM build parameter set assignments produced the expected, acceptable distortions or are different (e.g., greater) and/or new distortions introduced). In some instances, the AM build parameter set assignments might be adjusted or re-assigned if an outcome of their (simulated) use is not satisfactory.

In some aspects, process 200 is not limited to any particular AM modality. In some instances, process 200 may be adapted or otherwise applied to AM modalities, systems, and devices other than the specific DMLM process introduced above. In some aspects, the AM build parameter sets herein may include one or more different parameters, wherein the specific parameters included therein may vary depending the particular AM modality.

In some embodiments, aspects of the present disclosure may include or incorporate multi-laser load balancing to distribute work, for example evenly, to the different lasers of a multi-laser AM device, system, or machine for a build of a part. In some aspects, multi-laser load balancing may be used for at least part of an AM build of a part herein. In some embodiments, the capabilities of the lasers of a multi-laser AM device, system, or machine might be considered in assigning print parameter sets to the multiple different lasers. This aspect might be implemented as an optimization of one or more of the operations, processes, and systems of the present disclosure.

In some embodiments, aspects of the present disclosure might be applied to effect changes to one or more of bulk, contour, upskin, downskin, and other geometry-based print parameter sets to use in an AM build process. In some aspects and embodiments, a print parameter set herein may include a variety of parameters, such as but not limited to, laser power, scan speed, spot size, offset to original contour, and hatch/trace spacing. In some embodiments, aspects of the present disclosure might not be limited to the type of material used in an AM build. As such, aspects of the present disclosure may be used in applications including single material or multi-material parts. As used herein, a multi-material part may refer to the fabrication of parts using additive deposition of gradient alloys where a gradient alloy transitions from one metal to a different metal.

In some embodiments, the number of AM build parameter sets that might be specified for use in a single build of a particular part is not limited by the present disclosure. In some instances, a practical limit might be reached based on, for example, operating constraints of a particular AM device or system. In some instances, the number of AM build parameter sets specified for use in a single build of a particular part might be associated with or correspond to a (pre-)determined set number, particularly in the instance that little or minimum benefits are gained by using additional AM build parameter sets (if even possible).

In some aspects, a technical effect of some embodiments of the present disclosure is an improved technique and system for fabricating parts via AM processing. Some embodiments provide for leveraging a multi-laser AM device, system, or machine having two or more lasers to efficiently and accurately parts using multiple different print parameter sets in a single build, without transition zones by assigning each print parameter set to one of the multiple laser of the multi-laser AM device, system, or machine. A technical effect of some embodiments is a reduction in the time and cost of material/part production as compared to conventional AM processes.

Figure 4:
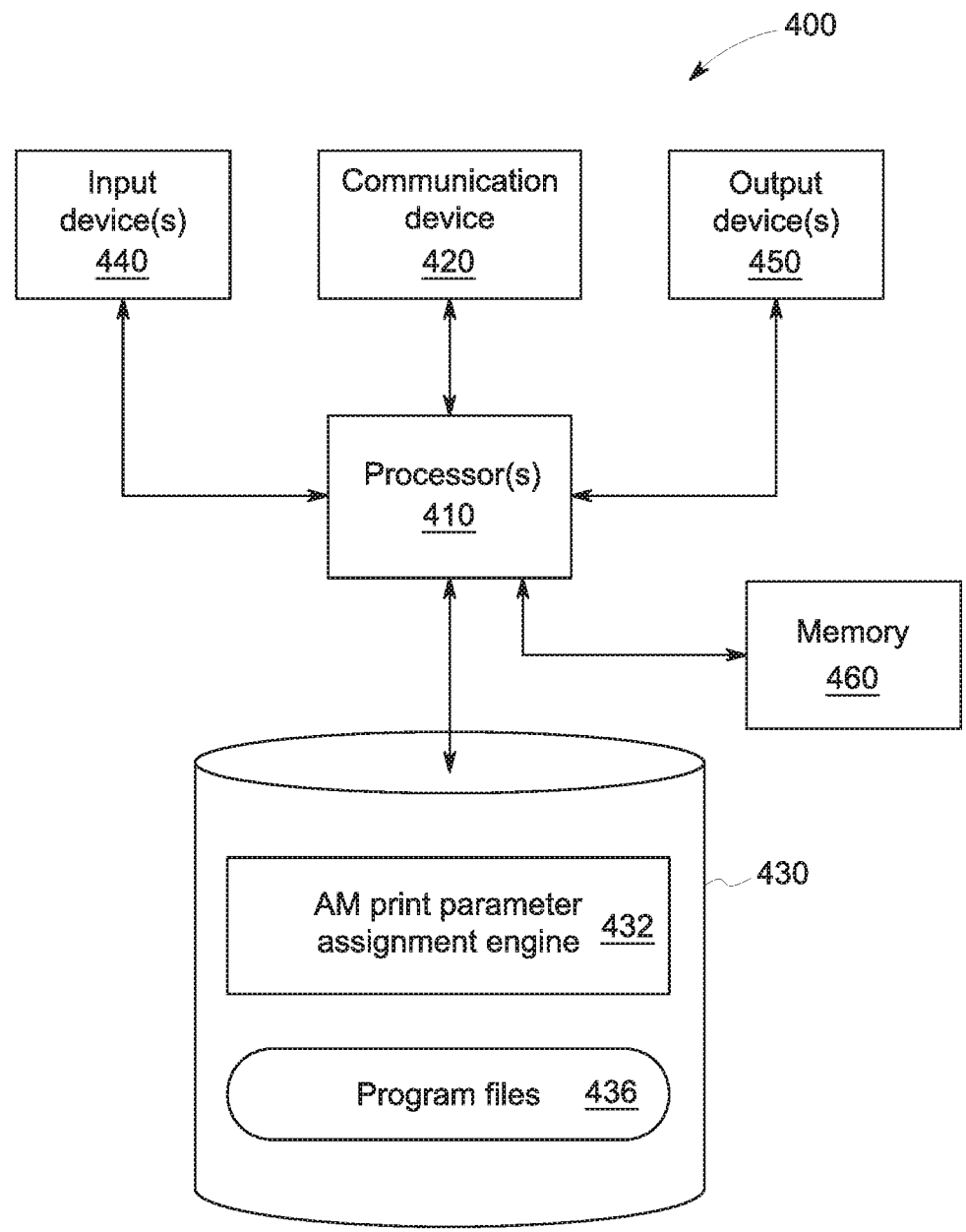
FIG. 4 illustrates a schematic diagram of a system, in accordance with some embodiments.

FIG. 4 is a block diagram of computing system 400 according to some embodiments. System 400 may comprise a general-purpose or special-purpose computing apparatus and may execute program code to perform any of the methods, operations, and functions described herein. System 400 may comprise an implementation of one or more systems (e.g., an AM system or parts thereof, etc.) and processes (e.g., process 200 and/or portions thereof). System 400 may include other elements that are not shown, according to some embodiments.

System 400 includes processor(s) 410 operatively coupled to communication device 420, data storage device 430, one or more input devices 440, one or more output devices 450, and memory 460. Communication device 420 may facilitate communication with external devices, such as a data server and other data sources. Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to enter information into system 400. Output device(s) 450 may comprise, for example, a display (e.g., a display screen) a speaker, and/or a printer.

Data storage device 430 may comprise any appropriate persistent storage device, including combinations of magnetic storage devices (e.g., magnetic tape, hard disk drives and flash memory), optical storage devices, Read Only Memory (ROM) devices, etc., while memory 460 may comprise Random Access Memory (RAM), Storage Class Memory (SCM) or any other fast-access memory. Files including, for example, model representations of a part, output records of processes (e.g., process 200 and/or portions thereof) herein, and other data structures may be stored in data storage device 430.

AM Print Parameter Assignment Engine 432 may comprise program code executed by processor(s) 410 (and within the execution engine) to cause system 400 to perform any one or more of the processes described herein. Embodiments are not limited to execution by a single apparatus. Data storage device 430 may also store data and other program code 436 for providing additional functionality and/or which are necessary for operation of system 400, such as device drivers, operating system files, etc.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of determining a design a part and a combination of a thermal support structure and a structural support structure.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method comprising:
    determining, by a processor, a first additive manufacturing (AM) print parameter set, the first AM print parameter set to include a first laser power setting, a first laser speed setting, and a first laser spot size setting;
    retrieving, by the processor, a three-dimensional model of a part, the three-dimensional model to include a set of material properties of the part, the first AM print parameter set corresponding to the set of material properties of the part;
    performing, by the processor, a physical load analysis associated with the three-dimensional model of the part to determine first material properties of a first region of a first layer of a plurality of layers of the part and second material properties of a second region of the first layer of the plurality of layers of the part, the physical load analysis to predict a first load on the first region and a second load on the second region, the first load associated with a first life cycles to failure of the first region and the second load associated with a second life cycles to failure of the second region;
    comparing, by the processor, the first life cycles to failure of the first region and the second life cycles to failure of the second region;
    adjusting, by the processor, the first AM print parameter set to correspond to the first region and the first life cycles to failure;
    when the second life cycles to failure of the second region is greater than the first life cycles to failure of the first region, generating, by the processor, a second AM print parameter set to correspond to the second region and the second life cycles to failure, the second AM print parameter set to include a second laser power setting, a second laser speed setting, and a second laser spot size setting;
    when the second life cycles to failure of the second region is greater than the first life cycles to failure of the first region by at least an order of magnitude, adjusting, by the processor, the second AM print parameter set to a low-fidelity print parameter set from a high-fidelity print parameter set;
    automatically assigning at least, by the processor, the first AM print parameter set for the first region of the first layer of the plurality of layers of the part to a first laser of a multi-laser AM device and the second AM print parameter set for the second region of the first layer of the plurality of layers of the part to a second laser of the multi-laser AM device, wherein the automatic assignment generates determined print parameter sets to laser assignments;
    saving a record of the determined print parameter sets to laser assignments; and
    transmitting the record of the determined print parameter sets to laser assignments to an AM controller, the AM controller to control the first laser and the second laser of the multi-laser AM device to generate the part in a single build of the plurality of layers including the first layer based on the three-dimensional model of the part and the assignment of print parameter sets to the first laser and the second laser.

2. The method of claim 1, wherein the automatically assigning includes assigning a third AM print parameter set for the first layer of an AM build to the first laser of the multi-laser AM device and assigning a different, fourth AM print parameter set for a second layer of the AM build to the second laser of the multi-laser AM device, the third AM print parameter set different than the first AM print parameter set.

3. The method of claim 1, when the second life cycles to failure of the second region is not greater than the first life cycles to failure of the first region, assigning the high-fidelity print parameter set for the first AM print parameter set and assigning the high-fidelity print parameter set to the first laser of the multi-laser AM device and assigning the low-fidelity print parameter set for the second AM print parameter set and assigning the low-fidelity print parameter set to the second laser of the multi-laser AM device.

4. The method of claim 1, wherein the first AM print parameter set includes at least one of an offset to an original contour setting, a hatch spacing setting, and a trace spacing setting.

5. The method of claim 4, wherein the first AM print parameter set is to include at least one geometry-based print parameter set including at least one of a bulk print parameter set, a contour print parameter set, an upskin print parameter set, and a downskin print parameter set.

6. The method of claim 1, wherein the part is a multi-material part fabricated via an additive deposition of gradient alloys that transition from a first metal to a second metal.

7. The method of claim 1, wherein a transfer function relates the first life cycles to failure to the first AM print parameter set and the second life cycles to failure to the second AM print parameter set.

8. The method of claim 1, wherein the low-fidelity print parameter set reduces the second life cycles to failure for the second region.

9. A system comprising:
a memory storing processor-executable instructions; and
one or more processors to execute the processor-executable instructions to:
  determine a first additive manufacturing (AM) print parameter set, the first AM print parameter set to include a first laser power setting, a first laser speed setting, and a first laser spot size setting;
  retrieve a three-dimensional model of a part, the three-dimensional model to include a set of material properties of the part, the first AM print parameter set corresponding to the set of material properties of the part;
  perform a physical load analysis associated with the three-dimensional model of the part to determine first material properties of a first region of a first layer of a plurality of layers of the part and second material properties of a second region of the first layer of the plurality of layers of the part, the physical load analysis to predict a first load on the first region and a second load on the second region, the first load associated with a first life cycles to failure of the first region and the second load associated with a second life cycles to failure of the second region;
  compare the first life cycles to failure of the first region and the second life cycles to failure of the second region;
  adjust the first AM print parameter set to correspond to the first region and the first life cycles to failure;
  when the second life cycles to failure of the second region is greater than the first life cycles to failure of the first region, generate a second AM print parameter set to correspond to the second region and the second life cycles to failure, the second AM print parameter set to include a second laser power setting, a second laser speed setting, and a second laser spot size setting;
  when the second life cycles to failure of the second region is greater than the first life cycles to failure of the first region by at least an order of magnitude, adjust the second AM print parameter set to a low-fidelity print parameter set from a high-fidelity print parameter set;
  automatically assign at least the first AM print parameter set for the first region of the first layer of the plurality of layers of the part to a first laser of a multi-laser AM device and the second AM print parameter set for the second region of the first layer of the plurality of layers of the part to a second laser of the multi-laser AM device, wherein the automatic assignment generates determined print parameter sets to laser assignments;
  save a record of the determined print parameter sets to laser assignments; and
  transmit the record of the determined print parameter sets to laser assignments to an AM controller, the AM controller to control the first laser and the second laser of the multi-laser AM device to generate the part in a single build of the plurality of layers including the first layer based on the three-dimensional model of the part and the assignment of print parameter sets to the first laser and the second laser.

10. The system of claim 9, wherein the automatically assigning includes assigning to a third AM print parameter set for the first layer of an AM build to the first laser of the multi-laser AM device and assigning a different, fourth AM print parameter set for a second layer of the AM build to the second laser of the multi-laser AM device, the third AM print parameter set different than the first AM print parameter set.

11. The system of claim 9, wherein the first AM print parameter set is the high-fidelity print parameter set and is assigned to the first laser of the multi-laser AM device and the second AM print parameter set is the low-fidelity print parameter set and is assigned to the second laser of the multi-laser AM device.

12. The system of claim 9, wherein the first AM print parameter set includes at least one of an offset to an original contour setting, a hatch spacing setting, and a trace spacing setting.

13. The system of claim 12, wherein the first AM print parameter set is to include at least one geometry-based print parameter set including at least one of a bulk print parameter set, a contour print parameter set, an upskin print parameter set, and a downskin print parameter set.

14. The system of claim 9, wherein the part is a multi-material part fabricated via an additive deposition of gradient alloys that transition from a first metal to a second metal.

15. A non-transitory computer-readable medium storing instructions that, when executed by a computer processor, cause the computer processor to perform a method comprising:
  determining a first additive manufacturing (AM) print parameter set, the first AM print parameter set to include a first laser power setting, a first laser speed setting, and a first laser spot size setting;
  retrieving a three-dimensional model of a part, the three-dimensional model to include a set of material properties of the part, the first AM print parameter set corresponding to the set of material properties of the part;
  performing a physical load analysis associated with the three-dimensional model of the part to determine first material properties of a first region of a first layer of a plurality of layers of the part and second material properties of a second region of the first layer of the plurality of layers of the part, the physical load analysis to predict a first load on the first region and a second load on the second region, the first load associated with a first life cycles to failure of the first region and the second load associated with a second life cycles to failure of the second region;
  comparing the first life cycles to failure of the first region and the second life cycles to failure of the second region;
  adjusting the first AM print parameter set to correspond to the first region and the first life cycles to failure;
  when the second life cycles to failure of the second region is greater than the first life cycles to failure of the first region, generating a second AM print parameter set to correspond to the second region and the second life cycles to failure, the second AM print parameter set to include a second laser power setting, a second laser speed setting, and a second laser spot size setting;
  when the second life cycles to failure of the second region is greater than the first life cycles to failure of the first region by at least an order of magnitude, adjusting the second AM print parameter set to a low-fidelity print parameter set from a high-fidelity print parameter set;
  automatically assigning at least the first AM print parameter set for the first region of the first layer of the plurality of layers of the part to a first laser of a multi-laser AM device and the second AM print parameter set for the second region of the first layer of the plurality of layers of the part to a second laser of the multi-laser AM device, wherein the automatic assignment generates determined print parameter sets to laser assignments;

saving a record of the determined print parameter sets to laser assignments; and transmitting the record of the determined print parameter sets to laser assignments to an AM controller, the AM controller to control the first laser and the second laser of the multi-laser AM device to generate the part in a single build of the plurality of layers including the first layer based on the three-dimensional model of the part and the assignment of print parameter sets to the first laser and the second laser.

16. The medium of claim 15, wherein the automatically assigning includes assigning a third AM print parameter set for the first layer of an AM build to the first laser of the multi-laser AM device and assigning a different, fourth AM print parameter set for a second layer of the AM build to the second laser of the multi-laser AM device, the third AM print parameter set different than the first AM print parameter set.

17. The medium of claim 15, when the second life cycles to failure of the second region is not greater than the first life cycles to failure of the first region, assigning the high-fidelity print parameter set for the first AM print parameter set and assigning the high-fidelity print parameter set to the first laser of the multi-laser AM device and assigning the low-fidelity print parameter set for the second AM print parameter set and assigning the low-fidelity print parameter set to the second laser of the multi-laser AM device.

18. The medium of claim 15, wherein the first AM print parameter set includes at least one of an offset to an original contour setting, a hatch spacing setting, and a trace spacing setting.

19. The medium of claim 18, wherein the first AM print parameter set is to include at least one geometry-based print parameter set including at least one of a bulk print parameter set, a contour print parameter set, an upskin print parameter set, and a downskin print parameter set.

* * * * *